United States Patent
Aubert

[15] 3,635,146
[45] Jan. 18, 1972

[54] HEATING APPARATUS FOR BREAD AND FILLER MATERIAL

[72] Inventor: Jean-Pierre Aubert, Geneva, Switzerland
[73] Assignee: Commercial Holding & Metals Corporation, Toronto, Canada
[22] Filed: Oct. 26, 1970
[21] Appl. No.: 83,981

[52] U.S. Cl............................99/339, 99/342, 219/446, 219/448, 219/453, 219/462, 219/477, 219/523, 219/530
[51] Int. Cl................................................A23, A47j
[58] Field of Search.................219/445–448, 451–453, 219/462, 466, 476–480, 523, 530, 521; 99/339, 342

[56] References Cited

UNITED STATES PATENTS

| | | | |
|---|---|---|---|
| 2,918,561 | 12/1959 | Percz | 219/530 X |
| 2,932,718 | 4/1960 | Masters | 219/530 X |
| 3,215,817 | 11/1965 | Pecli | 219/446 |
| 3,435,188 | 3/1969 | Collard | 219/530 X |

FOREIGN PATENTS OR APPLICATIONS

| | | | |
|---|---|---|---|
| 822,286 | 10/1959 | Great Britain | 99/339 |
| 1,141,066 | 3/1957 | France | 99/339 |

Primary Examiner—Volodymyr Y. Mayewsky
Attorney—Fleit, Gipple & Jacobson

[57] ABSTRACT

A heating device having six heating cones for simultaneously toasting and defining elongated central openings in bread, such as French bread, and having an electric range element on which the filler material may be heated. The heating cones are divided into two groups of three cones each, and the power delivered to each group is regulated by respective continuously adjustable controls. Similarly the power delivered to the electric range element is regulated by a continuously adjustable control. A pilot light is associated with each adjustable control member and indicates when that member is delivering power. The device is further provided with means for expelling unwanted heat from its casing.

9 Claims, 4 Drawing Figures

PATENTED JAN 18 1972

Jean-Pierre Aubert
INVENTOR.

BY
*Fleit, Gipple & Jacobson*
Attorneys

Jean-Pierre Aubert
INVENTOR.

BY
Fleit, Gipple & Jacobson
Attorneys

HEATING APPARATUS FOR BREAD AND FILLER MATERIAL

BACKGROUND OF THE INVENTION

Recently, the type of "sandwich" formed by carving a cavity into an elongated piece of bread, such as a piece of French bread, and by filling the cavity with a filler material, such as a frankfurter, meatballs, or the like, has increased in popularity. Customarily, the cavity is carved out of the piece of French bread by the manual manipulation of a knife. Then, the filler material is introduced into the cavity of the bread which may, if desired, be heated.

Understandably, the manual carving operation described above is slow and often results in poorly defined cavities. Further, if it is desired to heat the bread, an additional step in the "sandwich" preparation becomes necessary. That is, the bread is either heated first and then carved or is carved first and then heated. The third step in the process is the filling of the carved piece of bread. Therefore, the manual preparation is a time-consuming task.

There is a known device which overcomes the problems noted in the preceding paragraph. This device comprises four rodlike heating elements over which pieces of French bread are forced. The device also includes a range-type heating element sized so as to comfortably hold a pot. While this device overcomes many of the problems known to the prior art, there are still areas wherein improvement is desirable.

It is toward the elimination of the drawbacks mentioned above that the present invention is directed.

SUMMARY OF THE INVENTION

The present invention relates to a heating device which greatly facilitates the preparation of the type of "sandwich" wherein a piece of bread, such as French bread, is carved out and stuffed with a filler. The device includes six heating cones into which cartridge heaters are inserted and over which are forced pieces of French bread. With the cartridge heating elements activated, and with the French bread inserted over the heating cones, the French bread is toasted so that once removed from the cones, the bread is warm and the cavities are well defined.

The inventive device also includes an electric range element of a size adapted to comfortably hold a pot having a diameter on the order of 6 inches. In this manner, the filler material may be heated at the site where the French bread is toasted. Therefore, the "sandwich" preparation is conveniently accomplished.

In order to avoid the use of unnecessary electric power, the six cartridge heating elements are divided into two groups of three heaters each, with the heat output of each group being regulated by its own power control. Therefore, if less than four pieces of French bread are to be heated, it is necessary only to feed electric power to one set of heating elements. The electric range element is also provided with its own power control.

The power controls are continuously variable and, in this manner, the speed with which the bread is toasted and the degree to which it is toasted can be carefully managed. And, serving as an indication as to whether electric power is reaching a given heating element, three pilot lights are provided, one being provided with each set of heating cones and the third being provided with the electric range element.

Because substantial quantities of heat are generated by the inventive device, it becomes necessary to provide means for ensuring the release of heat from the unwanted areas. If this were not done, there would exist the constant danger that burns would result from touching the casing of the heating device. Therefore, the inventive heating device is provided with a number of heat outlets taking the form of holes defined in the body of the device and in the bottom plate thereof.

Accordingly, it is the main object of the present invention to provide a heating device having the capability of defining cavities in and simultaneously toasting a number of pieces of bread, such as French bread, and the further capability of heating a quantity of filler material.

It is a further object of the present invention to provide a heating device having a number of heating elements divided into sets wherein the power delivered to each set is individually controlled over a continuous range.

Yet a further object of the present invention is to provide a heating device whose heating elements are divided into sets and wherein each set is provided with means for indicating whether that set is receiving electric power.

It is a further object of the present invention to provide a heating device which delivers substantial quantities of heat where needed and which effectively eliminates heat from unwanted areas.

It is still a further object of the present invention to provide a heating device having a number of heating cones, each cone being associated with a cartridge heating element.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 2:
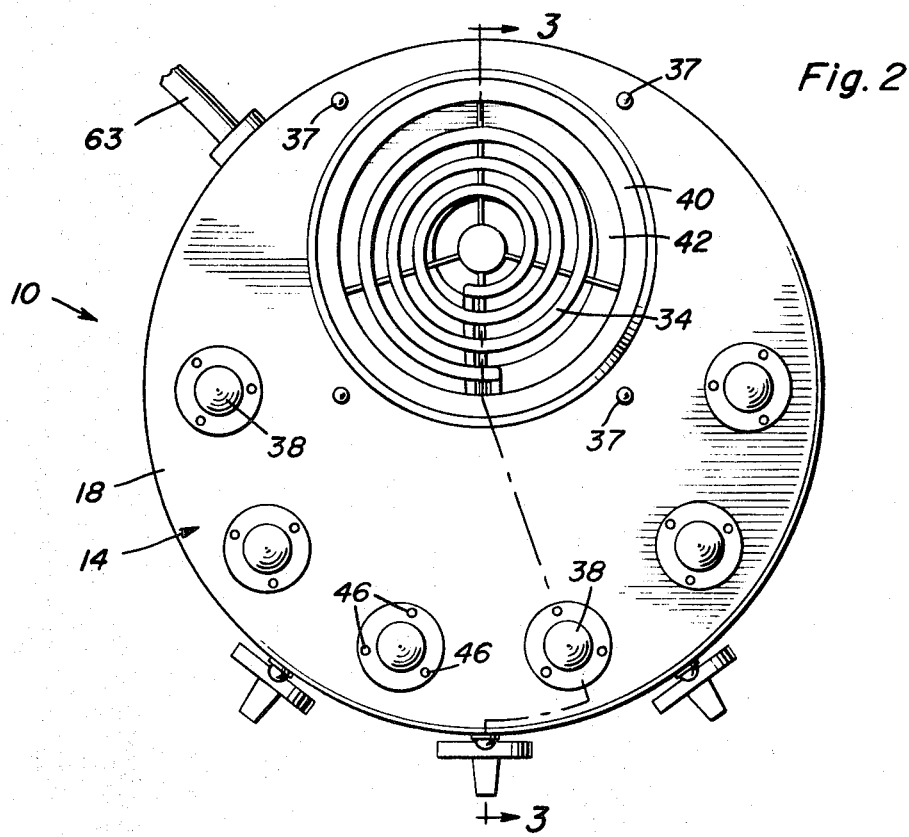
FIG. 2 is a top view of the device shown in FIG. 1.
Figure 1:
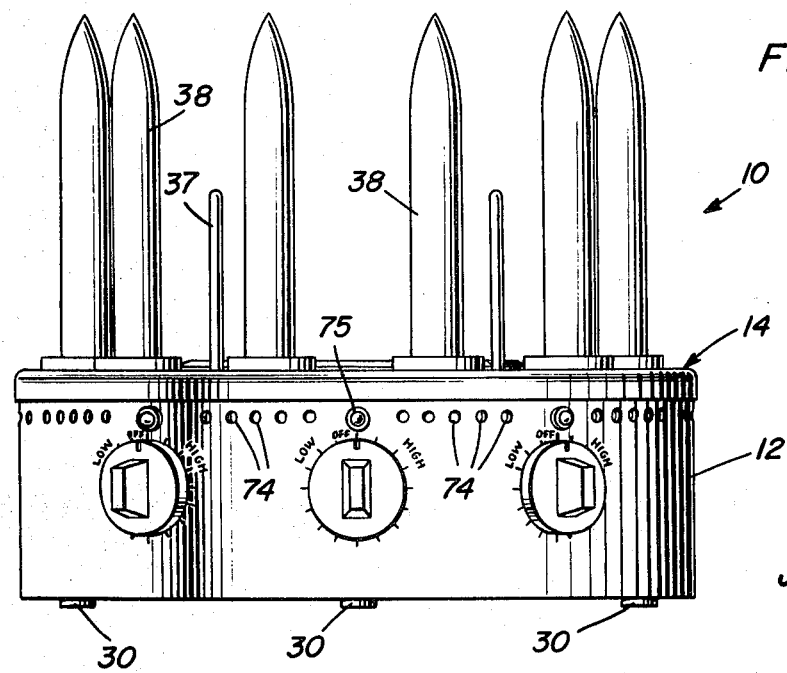
FIG. 1 is a front view of the heating device constructed in accordance with the teachings of the present invention.
Figure 3:
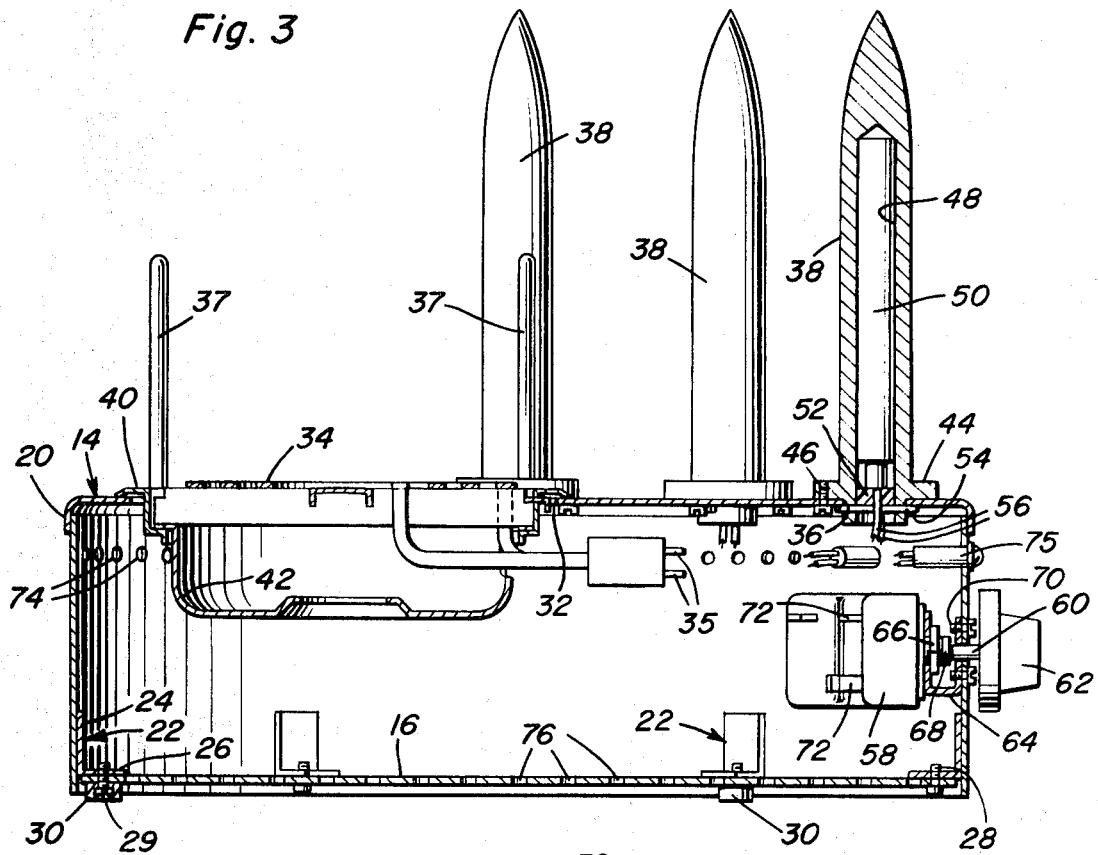
FIG. 3 is a sectional view taken along line 3—3 of FIG. 2.

With reference first to FIGS. 1 through 3, the heating device forming a part of the present invention will be described. The heating device is shown generally at 10 and comprises, basically, an open cylindrical body member 12 whose upper region is closed by a substantially circular cover 14 and whose bottom is closed by a circular bottom plate 16. The cover 14 has a flat circular base 18 and a downwardly extending cylindrical flange 20. The diameter of the flange is slightly greater than that of the cylindrical body member 12 and is adapted to snugly fit thereover. The cover 14 is preferably welded to the cylindrical body member 12.

The bottom plate 16 is removably attached to the cylindrical body member 12 with the aid of a brace member 22. The brace 22 comprises a first region 24 which is cylindrical in shape and which has a diameter slightly less than that of the cylindrical body member 12. The cylindrical region 24 of the brace member 22 is adapted to snugly fit within the inner wall of the body member 12. Preferably, the brace 22 is welded to the body member 12. The brace member 22 is also provided with an inwardly extending continuous ring 26 to which the bottom plate 16 is removably secured by means of a plurality of sheet metal screws 28. As seen in FIGS. 1 and 3, three feet 30 are uniformly spaced around the periphery of the ring portion 26 of the brace member 22 and are secured both to the bottom plate 30 and the ring portion 26 by means of sheet metal screws 29.

Several openings are carved into the face 18 of the cover 14. One relatively large opening 32 is provided for the insertion of an electric range element 34; and six smaller openings 36 are provided for mounting an equal number of rodlike steel heating cones 38. The electric range element 34 is supported in the cover 14 in a standard manner and is surrounded by four protective safety rods 37. A loosely fitting circular brace 40 supports the body of the range element 34 and further supports a standard splash pan 42. The electrical input to the range element 34 takes the form of a pair of leads 35.

The heating cones 38 are supported by the cover 14 by means of ringlike flanges 44 which are each secured to the cover 14 by means of three uniformly spaced screws 46.

The steel heating cones 38 are each coated with a material such as Teflon to avoid sticking, and are each provided with a central bore 48. A cartridge heating element 50 is located within the bore 48 of each steel heating cone 38 and is held in position by means of a washer 52 and a cotter pin 54 extending through the base of the associated heating cone. A pair of electrical leads 56 pass through the washer 52 and enter the cavity defined by the body member 12, the cover 14 and the bottom plate 16.

As will be explained when reference is made to FIG. 4, the inventive heating device is provided with three infinite controls 58. Each control is of the type having a rotatable shaft 60 provided with a control knob 62. As seen in FIG. 1, the control knobs 62, and thus the controls 58 have settings for "off" and are continuously variable from "low" temperature to "high" temperature. Electrical power is fed to the heating elements through infinite controls 58 and is introduced through cord 63.

Each infinite control 58 is mounted on a U-shaped brace 64 by a nut 66 threaded onto neck 68. Each brace 64 is, in turn, secured to the inner wall of the cylindrical body member 12 by means of sheet metal screws 70. Naturally, openings are provided in the brace 64 and in the cylindrical body member 12 to allow for the passage of the shaft 60. A pair of electrical leads 72 are provided on each infinite control 58.

Associated with each infinite control 68 is a pilot lamp 75, mounted through the cylindrical body member 12 and serving to indicate when electrical power is being fed to its associated infinite control 58. Therefore, the pilot lamps indicate the condition of the heating cones 38 and the range element 34.

Because substantial quantities of heat are generated by the cartridge heating elements 50 and by the electrical range element 34, there is a certain amount of heat which finds its way into the cavity defined by the cylindrical body member 12, the cover 14 and the bottom plate 16. Accordingly, it is necessary to provide for the expulsion of this undesirable heat from the internal cavity of the heating device. To this end, and as can be seen in FIGS. 1 and 3, a number of small openings 74 are circumferentially cut through the upper region of the cylindrical body member 12. These openings 74 extend in a relatively uniform manner entirely around the body member 12. In addition, the bottom plate 16 is provided, throughout its entire surface area, with small and evenly spaced heat exchange openings 76. It has been found that the combination of these openings 74 and 76 leads to the elimination of a large quantity of unwanted heat thereby reducing the danger of heat burns from touching the casing of the heating device 10.

Figure 4:
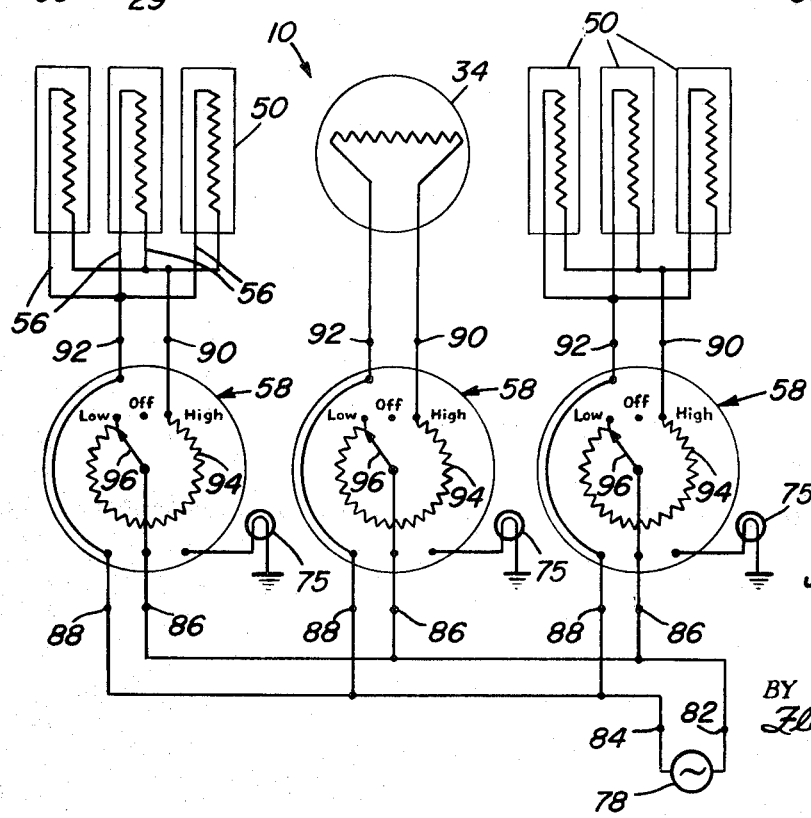
FIG. 4 is a circuit schematic showing the electrical configuration of the inventive heating device.

With reference now to FIG. 4, the electrical configuration of the inventive heating device 10 will be described. The input to the heating device 10 may, for example, take the form of a single-phase 240-volt AC supply 78 with a ground connection 80. The active terminals of the voltage source 78, shown at 82 and 84, are connected in parallel with each of the infinite controls 58. The input leads to each infinite control 58 are shown at 86 and 88, respectively, while the output leads thereof are indicated at 90 and 92.

As seen in FIG. 4, each infinite control 58 comprises a circular-type resistance element 94 and a rotatably variable tap 96 which may be set on a click-stop "off" position. The power lead 82 from the voltage source 78 is connected directly to the input lead 86 of the infinite control 58. The input lead 86 is, in turn, connected directly to the variable tap 96. Therefore, as shown clearly in FIG. 4, the input lead 86 is connected to the output lead 90 through the variable tap 96 and the resistance element 94. The power lead 84 from the voltage source 78 is connected directly to the input lead 88 of the infinite control 58, this input lead being short-circuited directly to the output lead 92. The output terminals 90 and 92 from the infinite control 58 serve as inputs either to the electrical range element 34, through leads 35, or to a parallel connection of three cartridge heating elements 50.

As seen in FIG. 4, the six cartridge heating elements are divided into two groups of three elements each, with each group controlled by a single infinite control 58. The third infinite control 58 is associated with the electric range element 34. In this manner, it is possible to heat either set of cartridge heating elements without the necessity for heating all of the elements, it being further possible to heat the electrical range element independent of the cartridge heaters.

The pilot lamps 75 shown in FIG. 4 may be associated with a respective infinite control 58 in any conventional manner. For example, each infinite control may be provided with a second knob-operated switch which feeds power to the pilot lamp when the tap 96 is switched from the "off" position. This connection is not shown in order to avoid unnecessary complexity in the schematic.

As noted previously, the power input takes the form of a three-wire single-phase 240-volt AC supply. Because of the high power involved, each infinite control is a 15-ampere 240-volt control; the electric range element is a 1,250-watt, 240-volt element; the cartridge heating elements are 285-watt, 240-volt elements; and the pilot lamps are 120-volt lamps. Naturally, because of the voltage capabilities of the pilot lamps, it is necessary to provide the lamp-activating circuit with means for reducing the input voltage by at least a factor of two.

Above, a specific embodiment of the present invention has been described. It should be appreciated, however, that this embodiment is described for purposes of illustration only and that numerous alterations and modifications may be practiced by those skilled in the art without departing from the spirit and scope of the invention. Accordingly, it is the intent that the invention not be limited by the above but be limited only as defined in the appended claims.

What is claimed is:

1. A heating device for simultaneously defining a cavity in and heating a plurality of pieces of bread, such as pieces of French bread, and having the additional capability of heating a filler, the device comprising: a main body casing; an electric range element mounted in the top of said casing; a plurality of heating cones spaced from said electrical range element, and from each other, and mounted in the top of said casing; a central bore in each of said heating cones; a cartridge heating element removably secured in the bore of each of said heating cones; and means for controlling the electrical power input to, and thus the heat output of, said electric range element and said plurality of heating cones.

2. The heating device recited in claim 1, wherein said heating cones are divided into sets and wherein each set is provided with a separate power control element.

3. The heating device recited in claim 2, wherein said electric range element is provided with its own power control element.

4. The heating device recited in claim 3, wherein said power control elements are each infinite controls and are each provided with an "off" position.

5. The heating device set forth in claim 4, and further comprising a plurality of pilot lamps equal in number to the number of power controls, each power control being associated with a respective pilot lamp.

6. The heating device recited in claim 5, and further comprising means for eliminating unwanted heat from said casing.

7. The heating device recited in claim 6, wherein said means for removing heat takes the form of a plurality of holes defined in said casing.

8. The heating device recited in claim 1, wherein said cartridge heating elements are each maintained in position within the bore of its associated heating cone by means of a washer and a removable cotter pin.

9. The heating device recited in claim 1, wherein each of said heating cones is coated with a material to avoid the sticking of food thereto.

* * * * *